United States Patent [19]

Müller et al.

[11] Patent Number: 5,315,096

[45] Date of Patent: May 24, 1994

[54] DEACTIVATOR FOR RESONANCE LABELS

[75] Inventors: Philipp Müller, Greifensee; Alain Wacker, Feuerthalen, both of Switzerland

[73] Assignee: Actron Entwick Lungs AG, Rotkreutz, Switzerland

[21] Appl. No.: 834,469

[22] Filed: Feb. 12, 1992

[30] Foreign Application Priority Data

Feb. 12, 1991 [CH] Switzerland .................. 434/91

[51] Int. Cl.[5] ............................................ G06K 7/10
[52] U.S. Cl. ................................ 235/462; 235/472; 340/572
[58] Field of Search .............. 340/572; 235/449, 472, 235/462; 335/4; 343/788

[56] References Cited

U.S. PATENT DOCUMENTS

| | | | |
|---|---|---|---|
| 3,031,667 | 11/1959 | Wennerberg | 343/788 |
| 3,495,264 | 12/1966 | Spears | 343/788 |
| 5,059,951 | 10/1991 | Kaltner | 340/572 |

*Primary Examiner*—Davis L. Willis
*Assistant Examiner*—Karl D. Frech
*Attorney, Agent, or Firm*—William Squire

[57] ABSTRACT

The described device is part of a product theft prevention system and is used for deactivating resonance labels. It is intended for use in combination with a hand-held optoelectronic bar code reader (1), so as to permit the deactivation at the checkout of shops and stores of electronic resonance labels provided with a bar code and attached to products in a single operation and simultaneously with the determination of the bar-coded data. The deactivator has antennas (8, 9), which are located in a casing (11) fixable externally to the front end of the hand-held bar code reader (1) and which are constructed as ferrite antennas. As a result of the housing of the antennas (8, 9) and preferably all the high frequency-carrying parts (14, 15) of the deactivator in a separate casing (11), the deactivator can be used in combination with any random hand-held bar code reader, without any changes having to be made to the latter.

16 Claims, 1 Drawing Sheet

DEACTIVATOR FOR RESONANCE LABELS

TECHNICAL FIELD

The present invention relates to a device for deactivating resonance labels provided with a printed on bar code for use in constructional combination with an optoelectronic, hand-held bar code reader, as part of an electronic product theft prevention system. As a result of the aforementioned combination electronic resonance labels applied to products and provided with a bar code can be deactivated at the checkout of shops and stores at the same time as the determination of the bar-coded data.

PRIOR ART

A deactivator of the aforementioned type is known from WO 90/05968. In the known deactivator the transmitting antenna and the receiving antenna are constructionally integrated into the casing of a pistol-like hand-held bar code reader. They are constructed as air-cored coils and are positioned in directly succeeding manner in the front part of the hand-held reader. Their turns wind around the optical path of the bar code reader. In the same casing is integrated a so-called matching circuit connected to the antennas. Between said matching circuit and an external, fixed control unit radiofrequency signals are transmitted across a screened, multicore cable. Radiofrequency signals of the bar code reader are transmitted along the same cable.

Between the high frequency signals of the deactivator and the bar code reader there is a problem of undesired interference. To avoid this, in the device according to WO 90/05968, there are special, but not described, constructional and circuitry measures, as well as screening measures.

As a result of the limited size of the antennas due to the installation thereof in the hand-held bar code reader casing, the range of the known deactivator is very limited. Deactivation only functions if the hand-held reader is brought very close to the label. Therefore improvements are necessary with respect to the range. Its improvement by increasing the intensity of the electromagnetic field emitted by the transmitting antenna is not readily possible inter alia due to the aforementioned interference problems. An increase in the field intensity could also impair the operation of the electronics of other equipment located in the vicinity (e.g. cash register systems).

The casing of the hand-held bar code reader known from WO 90/05968 is large compared with modern equipment. There is generally little or no further space available in modern hand-held bar code readers for the additional installation of components required for deactivating resonance labels. Therefore a subsequent fitting of such elements is either difficult or impossible. Therefore special hand-held readers with special casings must be designed.

The deactivator according to WO 90/05968 operates continuously, i.e. the electromagnetic field emitted by means of the transmitting antenna has a specific frequency at all times. However, this frequency is not fixed and instead sweeps a given frequency range, which contains the resonant frequency of the resonance label. As a result of the sweep it is possible to detect the resonant frequency of the label to be deactivated in a first stage and then, in a following, second stage, it is deactivated with an electromagnetic field precisely at this frequency.

EP-A1-287 905 discloses a deactivator, which also has a transmitting antenna and a receiving antenna. Unlike in the case of the device known from WO 90/05968, it operates in pulsed manner, i.e. a needle pulse is used for deactivating the resonance label. Therefore there is no possibility to detect the resonant frequency of the label to be deactivated.

DESCRIPTION OF THE INVENTION

The problem of the present invention is to give a device of the aforementioned type, which can be constructionally combined with a plurality of very varied commercially available, hand-held bar code readers without special adaptation measures and without interference problems. The device must be small, inexpensive and have an improved range.

According to the invention this problem is solved by a device having the features of claim 1.

Therefore the inventive device is characterized in that the antennas are positioned in a casing which can be fixed to the outside of the front end of the hand-held bar code reader and are constructed as ferrite antennas.

As a result of the housing of the antennas and preferably further components of the deactivator in a separate casing, the deactivator can be substantially used in combination with any random hand-held bar code reader, without it being necessary to make any changes or perform any adaptation measures. Screening to prevent interference is very simple. The placing of the antennas in a separate casing is more particularly made possible as a result of their construction as ferrite antennas. Therefore they can be made much smaller than air-cored coils and there is also a very effective directional action for the emitted electromagnetic field and consequently an improved deactivation range.

Advantageous developments of the invention are characterized in the dependent claims.

BRIEF DESCRIPTION OF THE DRAWINGS

An embodiment of the invention is described hereinafter relative to the drawings, wherein show.

The same parts carry the same reference numerals in the drawings.

MANNER OF REALIZING THE INVENTION

Figure 1:
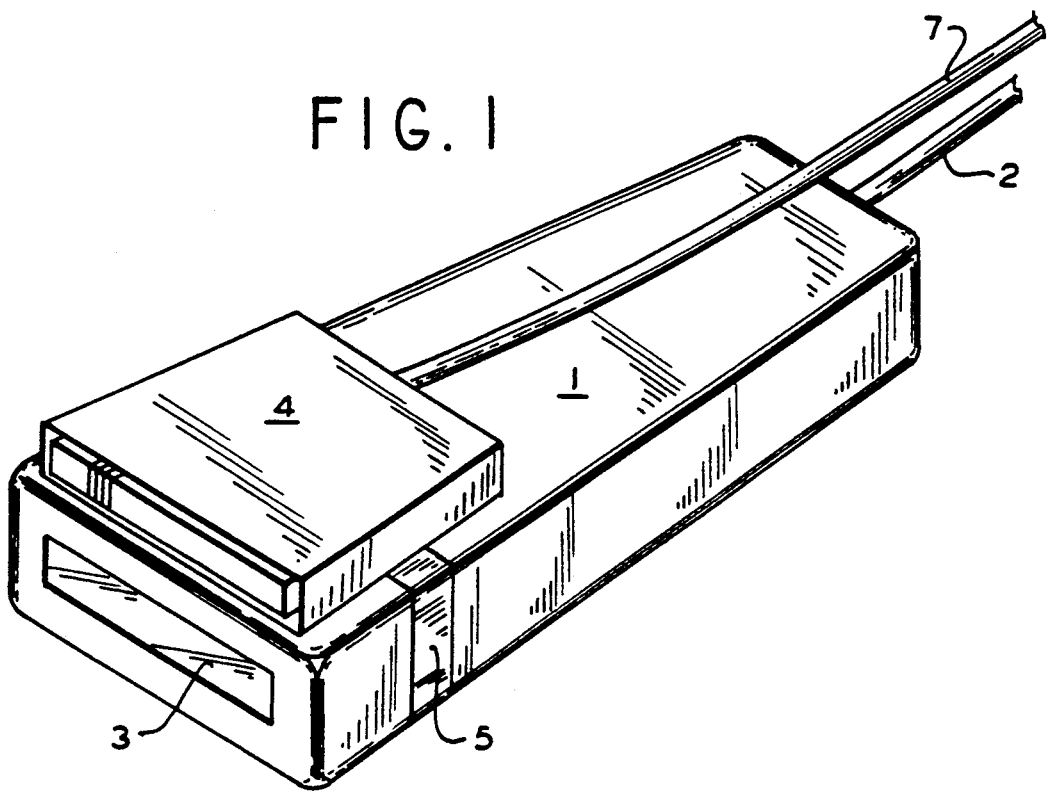
FIG. 1 A hand-held bar code reader with a transmitting and receiving head of an inventive deactivator externally fixed thereto.

In FIG. 1 1 is a hand-held bar code reader. The latter is e.g. connected by means of a cable 2 to a not shown electronic cash register. On its front end it is provided with a window 3 enabling bar code scanning, e.g. with a laser beam. The hand-held bar code reader can have a conventional construction and consequently need not be described in greater detail.

A transmitting and receiving head 4 of a deactivator is fixed at the bottom and outside to the hand-held bar code reader. As shown in FIG. 1, the transmitting and receiving head can be fixed by means of a band 5 to the hand-held bar code reader, but any other fastening method is also suitable. By means of a multicore connecting cable 7 the transmitting and receiving head 4 is connected to a fixed base unit 16, which is only shown in FIG. 3.

Figure 2:
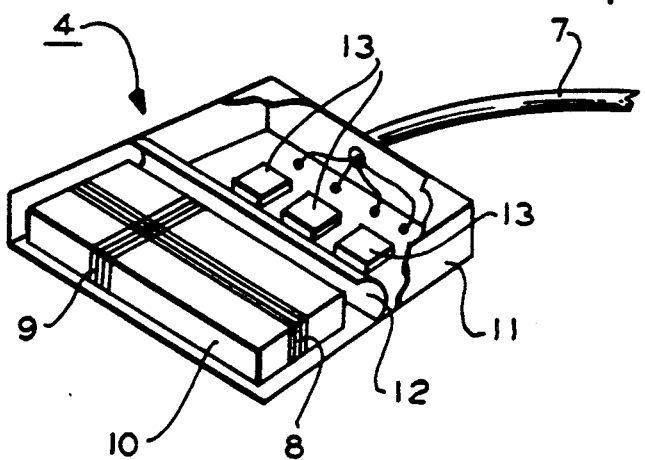
FIG. 2 The transmitting and received head of FIG. 1, in partly cut away form.

The transmitting and receiving head 4 has a transmitting antenna 8 and a receiving antenna 9, which are constructed as ferrite antennas. The coil windings of both antennas are wound orthogonal to one another on a single, flat ferrite core. The orthogonal arrangement of the two antenna windings serves to bring about a reciprocal decoupling thereof. The ferrite core 10 provided with the antenna windings is located in the front part of a flat casing 11, which is either, according to FIG. 1, open or is closed with a material which transmits radiofrequency electromagnetic waves. However, the remainder of the casing 11 and at least on its underside facing the hand-held bar code reader is made from a radiofrequency electromagnetic waveshielding material. In FIG. 2, the receiving antenna 9 lies in a plane normal to the plane of transmitting antenna 8 and is offset from the central axis of the transmitting antenna 8.

Figure 3:
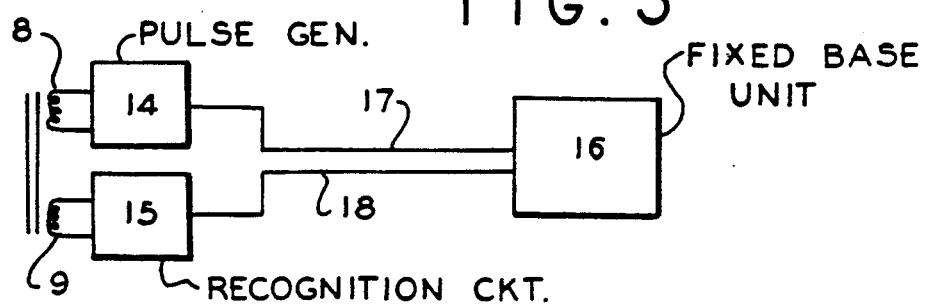
FIG. 3 A block diagram of the inventive deactivator.

In FIG. 2, in which the transmitting and receiving head 4 is shown with a partly cut away casing 11, it is possible to see that in the rear part of the casing 11 there are further components 13, which are separated by a shield 12 from the antennas 9 and 10. The electronic components 13 (e.g. three such components 13 are shown in FIG. 2, although no significance is attached to this number) on the one hand form a pulse generator for the transmitting antenna 8 generating needle pulses and on the other hand a recognition circuit connected downstream of the receiving antenna 9 for non-deactivated resonance labels excited to oscillate. In FIG. 3 the pulse generator is 14 and the recognition circuit 15.

The pulse generator 14 and the recognition circuit 15 are connected by means of the multicore connecting cable 7 to the aforementioned, fixed base unit 16. By means of lines not shown in FIG. 3, the base unit supplies the supply voltages required for the operation of the pulse generator 14 and the recognition circuit 15. For the pulse generator they are typically approximately 400 V and for the recognition circuit approximately 5 V (d.c. voltage). By means of a line 17 in FIG. 3, the base unit 16 supplies a clock signal for the pulse generator. The typical frequency of this clock signal is approximately 20 Hz.

Finally, the line 18 in FIG. 3 is used for transmitting a logic signal (or a binary signal) to the base unit, which is generated by the recognition circuit 15 on recognizing an oscillating resonance label (an oscillating resonance label is always detected if a sought deactivation has not been successful).

In principle, the entire arrangement comprising the two antennas 8, 9, the pulse generator 14, the recognition circuit 15 and the base unit 16 can be constructed and operated in the manner described in detail in the aforementioned EP-A1-287 905. With regards to the pulse generator, it can be essentially formed by a capacitor in series with a thyristor, as well as the transmitting antenna 8 as the inductance. For generating the desired needle pulse, the thyristor should have a very marked snap-off effect. The clock signal generated by the base unit is then used for firing the thyristor.

As no high frequency signals are transmitted by means of the connecting cable 7, it does not have to be shielded. Thus, no interference emanates from the cable 7.

I claim:

1. Device for use with a hand-held bar code reader for reading bar codes at a front end thereof, said device including means for deactivating resonance labels provided with a bar code, said device comprising a transmitting antenna for deactivating said labels and a receiving antenna for receiving signals transmitted by said labels, and a casing for receiving the antennas therein, said casing including means adapted to be externally fixed to a region adjacent to the front end of the hand-held bar code reader such that the bar code reader reads said bar code and the antennas cooperate with said labels, said antennas being constructed as ferrite antennas.

2. Device according to claim 1 wherein the antennas each include a coil winding, the coil windings of the transmitting antenna and the receiving antenna being wound orthogonal to one another on a single flat ferrite core.

3. Device according to claim 1, characterized in that at least on one side, towards the hand-held bar code reader, the casing is provided with a shield against radiofrequency electromagnetic waves.

4. Device according to claim 1, characterized in that the transmitting antenna is connected as an inductance in the circuit of a pulse generator generating needle pulses.

5. Device according to claim 4, characterized in that the pulse generator is placed in the casing.

6. Device according to claim 1, characterized in that the receiving antenna is in circuit with a recognition circuit responsive to signals received by the receiving antenna for non-deactivated resonance labels excited to oscillate and which generates a logic signal on recognizing an oscillating resonance label.

7. Device according to claim 6, characterized in that the recognition circuit is also located in the casing.

8. Device according to claim 1 including a fixed base unit and a separate multicore connecting cable, characterized in that the recognition circuit includes components, the components being located in the casing and are connected by said separate, multicore connecting cable to the fixed base unit.

9. Device according to claim 8, characterized in that the connecting cable has no lines specifically constructed for the transmission of radiofrequency signals and has no shield against radiofrequency electromagnetic waves.

10. Device for use with resonance labels provided with a bar code, said device comprising:
a hand held bar code reader for reading bar codes positioned adjacent to an end of said reader, said reader including a housing;
means for deactivating resonance labels provided with said bar code and including a ferrite receiving antenna and a ferrite transmitting antenna;
a casing for securing said antennas therein; and
means for securing the casing to and external the housing with the antennas adjacent to said housing end such that said resonance labels and antennas are responsive to one another and the bar code reader is responsive to the bar codes on said labels.

11. The device of claim 10 further including electroradiation shielding between said housing and casing.

12. The device of claim 10 wherein the antennas are orthogonal to each other and wherein the bar code reader and the transmitting antenna have a central axis, the receiving antenna being offset from said central axis.

13. The device of claim 12 including a ferrite core and a coil winding for each said antennas.

14. The device of claim 13 wherein the coil winding of each antenna is wound about the same ferrite core.

15. A device for deactivating resonance labels each having a bar code, said device for use with a hand held bar code reader including a housing having a front end, said device comprising;

a receiving antenna formed with a ferrite core;
a transmitting antenna formed with a ferrite core;
means for causing the transmitting antenna to transmit a signal, said receiving antenna being responsive to a resonant signal produced by a resonant label, said receiving antenna being oriented to receive said resonant signal;
a casing for receiving therein said antennas and said means for causing; and
means for securing the casing to and external said housing such that the antennas and reader are respectively responsive to a given resonance label and bar code thereon positioned adjacent to said front end.

16. The device of claim 15 wherein the antennas have a common ferrite core and include coils on the core oriented orthogonal to each other.

* * * * *